United States Patent

Jodet et al.

(10) Patent No.: US 10,024,176 B2
(45) Date of Patent: Jul. 17, 2018

(54) ROTOR BLADE WITH REDUCED ACOUSTIC RESPONSE

(71) Applicant: SNECMA, Paris (FR)

(72) Inventors: Norman Bruno André Jodet, Savigny-sur-Orge (FR); Hervé Rolland, Le Raincy (FR)

(73) Assignee: SNECMA, Paris (FR)

(*) Notice: Subject to any disclaimer, the term of this patent is extended or adjusted under 35 U.S.C. 154(b) by 388 days.

(21) Appl. No.: 14/918,241

(22) Filed: Oct. 20, 2015

(65) Prior Publication Data

US 2016/0115798 A1 Apr. 28, 2016

(30) Foreign Application Priority Data

Oct. 23, 2014 (FR) ...................... 14 60203

(51) Int. Cl.

| F01D 5/28 | (2006.01) |
|---|---|
| F01D 5/16 | (2006.01) |
| F01D 5/00 | (2006.01) |
| F01D 5/14 | (2006.01) |

(52) U.S. Cl.
CPC ............. *F01D 5/288* (2013.01); *F01D 5/00* (2013.01); *F01D 5/145* (2013.01); *F01D 5/16* (2013.01); *F05D 2260/96* (2013.01); *F05D 2260/961* (2013.01); *F05D 2260/962* (2013.01); *Y02T 50/673* (2013.01)

(58) Field of Classification Search
CPC ............. F01D 5/145; F01D 5/16; F01D 5/288
See application file for complete search history.

(56) References Cited

U.S. PATENT DOCUMENTS

| 3,741,285 A | * | 6/1973 | Kuethe | B64C 21/10 165/109.1 |
|---|---|---|---|---|
| 4,318,669 A | * | 3/1982 | Wennerstrom | F01D 9/02 415/119 |
| 4,720,239 A | * | 1/1988 | Owczarek | F01D 5/141 415/119 |
| 2007/0217916 A1 | * | 9/2007 | Bamberg | F01D 5/145 416/223 R |
| 2009/0317238 A1 | | 12/2009 | Wood et al. | |
| 2011/0200442 A1 | * | 8/2011 | Routier | F01D 5/141 416/223 A |
| 2012/0103430 A1 | * | 5/2012 | Lin | F01D 5/145 137/15.01 |
| 2016/0348694 A1 | * | 12/2016 | Macchia | F01D 5/145 |

FOREIGN PATENT DOCUMENTS

| EP | 2 746 533 A1 | 6/2014 |
|---|---|---|
| EP | 2 789 798 A2 | 10/2014 |
| WO | WO 01/98653 A1 | 12/2001 |
| WO | WO 2014/143426 A1 | 9/2014 |

OTHER PUBLICATIONS

Search Report dated Jun. 9, 2015, in corresponding French Patent Application No. 1460203, filed on Oct. 23, 2014 (2 pages).

* cited by examiner

*Primary Examiner* — Woody Lee, Jr.
(74) *Attorney, Agent, or Firm* — Bookoff McAndrews, PLLC

(57) ABSTRACT

A turbine engine rotor blade having a trailing edge (20A) with a modified surface state (22, 28) enabling the flow speed passing around the blade to be altered so as to modify the acoustic interaction against structural elements (12) that interact with the flow downstream from the rotor blade.

7 Claims, 3 Drawing Sheets

ROTOR BLADE WITH REDUCED ACOUSTIC RESPONSE

CROSS-REFERENCE TO RELATED APPLICATIONS

This application claims priority to French Patent Application No. FR 1460203, filed on Oct. 23, 2014, the entirety of which is incorporated herein by reference.

BACKGROUND OF THE INVENTION

The present invention relates to the general field of rotor blades of a turbine engine, and more particularly to rotor blades having a wake that impacts against an aerodynamic surface downstream.

In known manner, such a configuration is to be found in numerous propulsion systems, e.g. between the upstream and downstream rotors of a pair of contrarotating propellers, or of a contrarotating fan of a turbojet, between a propeller and a wing, or between a propeller and the compressor of a turboprop, or between the fan and the outlet guide vanes (OGVs) or between the fan and the compressor of a turbofan, or between the rotor and the pylon of a propeller or of a pair of propellers of a turboprop installed at the rear of the fuselage.

Conventionally, the wake from the rotor impacts against a downstream element after a constant time interval. Nevertheless, as shown in FIG. 1, which shows interaction between the blades 10 of a fan rotor and an OGV 12, all of the blades generate identical wakes 14 that present a constant distribution 16 in azimuth. This feature is troublesome since it causes energy to be concentrated at a single frequency, thereby giving rise to engine noise having a single spectrum line 18, referred to as an interaction line, as shown in FIG. 2.

OBJECT AND SUMMARY OF THE INVENTION

The present invention thus seeks to mitigate such a drawback by proposing a turbine engine rotor blade presenting a surface state that is modified at its trailing edge. The invention also seeks to conserve the general mechanical strength of the blade, which is a part that is subjected to very high levels of mechanical stress.

To this end, there is provided a turbine engine rotor having a plurality of rotor blades having a wake that impacts against structural elements mounted downstream, each of said rotor blades having a determined zone between a trailing edge and at most 50% of the chord of the blade with a surface state that is modified, the rotor being characterized in that said determined zones of two consecutive blades are of different lengths, thereby enabling the speed of the flow over said blades to be altered in such a manner as to modify the acoustic interaction against structural elements interacting with said flow downstream from said rotor blade.

Thus, by modifying the surface state of each blade at its trailing edge, an azimuth distribution of wakes is obtained that is not constant (having different propagation angles), thereby having the effect of transforming the associated noise spectrum by converting the target interaction spectrum line that is troublesome for the turbine engine into a multitude of spectrum lines of smaller amplitude.

Preferably, said determined zone is present over the entire height of the blade.

In a particular embodiment, said modified surface state may be present on the suction side of the blade and may comprise applying a textured paint or adhesively bonding a material acting as a rough skin, thereby slowing down the flow on approaching said trailing edge.

In another particular embodiment, said modified surface state is present on the pressure side of the blade and may comprise applying a textured paint or adhesively bonding a material providing a surface that is more effective from an aerodynamic point of view, such as a "shark's skin", so as to accelerate the flow on approaching said trailing edge.

BRIEF DESCRIPTION OF THE DRAWINGS

Other characteristics and advantages of the present invention appear from the following description made with reference to the accompanying drawings which show an embodiment having no limiting character. In the figures.

DETAILED DESCRIPTION OF AN EMBODIMENT

Figure 3:
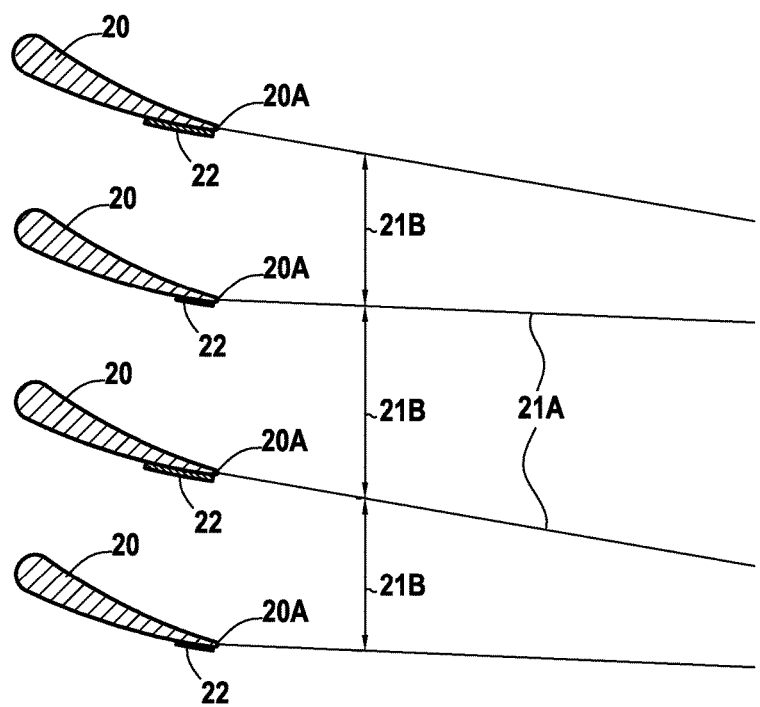
FIG. 3 is view showing the impact of the wake from a rotor having blades that have been modified in accordance with the invention.

FIG. 3 shows a row of turbine engine rotor blades 20 in a partially-developed (or unwound) form, in accordance with the present invention, e.g. fan rotor blades.

In accordance with the invention, it is proposed to modify the surface state of the blades locally, on the pressure side or the suction side, over a zone extending from the trailing edge 20A to at most 50% of the chord in order to process the wakes from the blades, which wakes propagate downstream (propagating on a large scale) against structural elements, thereby modifying the resulting acoustic interaction on those elements.

Figure 1:
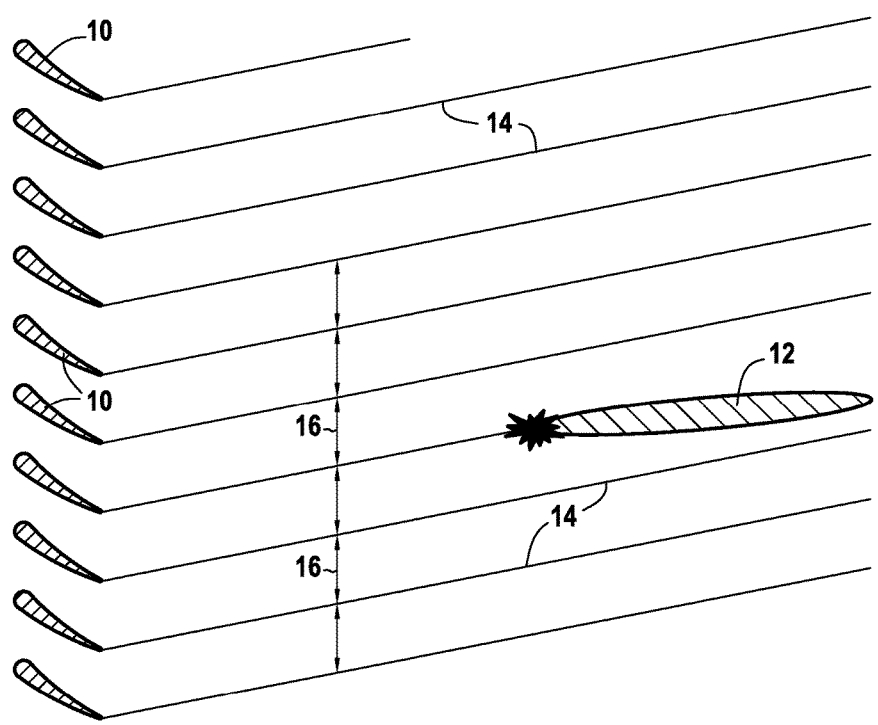
FIG. 1 is a view showing the impact of the wake from a rotor on a downstream element in the prior art.

The modification to the surface state of a blade serves to obtain a modification to the flow speed passing around the blade by disorganizing the structure of the wake 21A (which then no longer presents a constant distribution 21B in azimuth) as generated by the bladed wheel (the rotor) so as to counter the periodicity of the interaction associated with the impact of the wake against the surfaces that interact with the flow downstream (e.g. the OGV in FIG. 1). Furthermore, there is also an alteration to the nature of the flow, i.e. a modification to the amount of turbulence and more particularly an increase in said amount in order to improve the ability to withstand separation phenomena of the boundary layer.

When the surface having its state modified on its downstream portion is on the suction side, the idea is to obtain more roughness so as to slow down the flow as it approaches the trailing edge, thereby obtaining the looked-for effect. In contrast, when the surface having its state modified on its downstream portion is on the pressure side, the idea is firstly to obtain a surface that is more effective from an aerodynamic point of view in order to accelerate the flow on approaching the trailing edge, and secondly, also to obtain the looked-for effect of altering the flow.

Figure 3A:
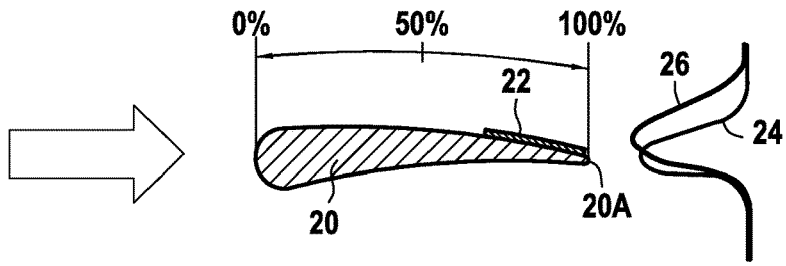
FIGS. 3A to 3C show two examples of blades that have been modified in accordance with the invention and the resulting noise spectrum.

For this purpose, in a first embodiment as shown in FIG. 3A (modifying the surface state of the blade on the suction side), the blade 20 is provided with a rough surface portion 22 (of thickness that has been exaggerated deliberately in order to show up better) for the purpose of creating a zone in which friction is increased so as to slow down the flow locally. This zone is situated on the suction side, since the flow speed is greater over the suction side, and thus the potential for deceleration is more advantageous on the suction side. Furthermore, it is a zone that is subjected to separation of the boundary layer, which is penalizing for aerodynamic and acoustic performance. Increasing roughness in this location thus serves to avoid that type of phenomenon (i.e. it minimizes the appearance of separation of the boundary layer).

This surface may be provided by applying textured paint or by adhesively bonding a material that acts as a rough skin. Thus, reducing speed on the suction side of the airfoil of the blade has the consequences firstly of modifying the shape of the wake, as shown by an initial wake speed curve 24 for a standard blade (with a very clear speed deficit characterizing wake (the indented portion)) and by a curve 26 for the modified wake, and secondly of acting on its propagation characteristics (azimuth position, propagation direction).

Preferably, the rough surface 22 is positioned in close proximity to the trailing edge 20A (preferably from 50% of the chord to 100%), thereby serving to minimize the efficiency penalty (since this zone is more lightly loaded from an aerodynamic point of view), and to act directly at the start of the wake in order to maximize action on the flow. In addition, the rough surface advantageously extends over the full height of the blade. In the axial direction (along the chord of the airfoils), its length may vary between consecutive blades in order to increase or decrease the influence of the blade on the flow (see FIG. 3). The longer the time that contact endures between the surface 22 and the flow, the greater the extent to which the flow is influenced by said surface.

Figure 3B:
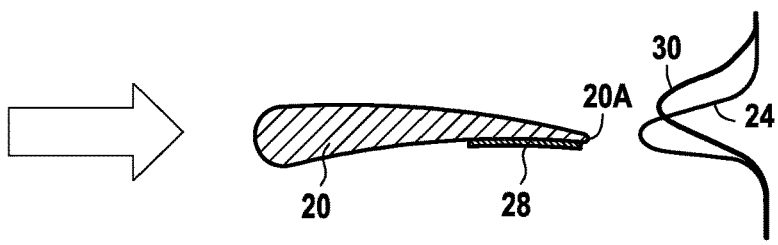

In a second embodiment as shown in FIG. 3B (modifying the surface state of the blade on its pressure side), the blade 20 is provided with a zone of increased effectiveness 28 by having recourse to a "shark's skin" type technology (a surface having grooves on a very small scale serving to reduce the coefficient of friction of a surface). This zone is positioned on the pressure side since the flow speed over the pressure side is slower, and so the potential on the pressure side for acceleration is more advantageous.

As with the rough surface 22, this "shark's skin" surface 28 may be implemented by applying a textured paint or by adhesively bonding a material acting as an effective skin on the blade. Thus, the increase in speed on the pressure side has the consequences of modifying the shape of the wake as shown by the same initial wake speed curve 24 and a modified wake curve 30, and of acting on its propagation characteristics (azimuth positioning, propagation direction).

Figure 2:
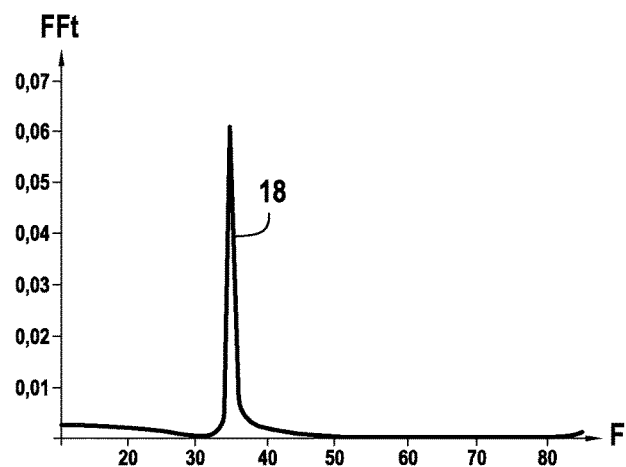
FIG. 2 shows an engine noise spectrum line representing the interaction that appears when using the FIG. 1 rotor.
Figure 3C:
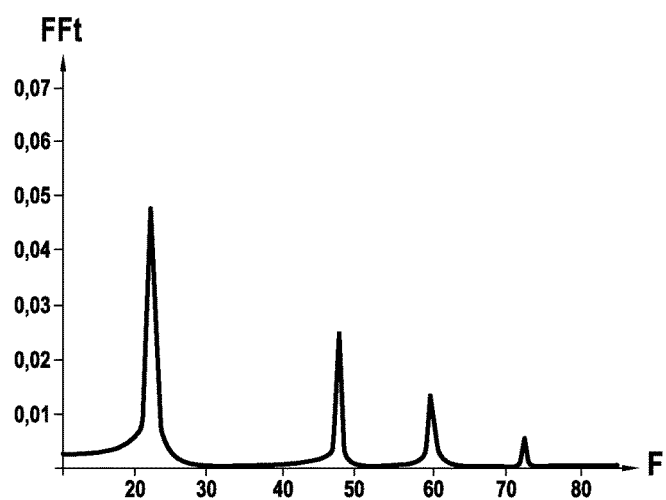

Thus, by varying the level of aerodynamic effectiveness (roughness or effectiveness of the "shark's skin" surface) between consecutive blades, the wakes from the blades are influenced in different manners so that the energy of the acoustic interaction (impact of the wake against a surface) no longer takes place with a single interaction spectrum line, but rather at a plurality of frequencies, as shown in FIG. 3C, in which, in addition, the maximum level of noise is lower than the maximum level of noise in the prior art as shown in FIG. 2, thus making it possible to control speed asymmetrically at the trailing edge of the blades.

It should be observed that although the invention is shown with reference to only two consecutive blade profiles, its principle can naturally be extended to more than two blade profiles, and in the extreme, it is possible to envisage using only different profiles for producing consecutive wakes that are all different, i.e. using as many different surface configurations (in terms of positioning and extent) as there are blades (e.g. 12 different configurations for a rotor having 12 blades). The greater the number of different surfaces, the more frequency content is spread, and thus the lower the maximum observed acoustic pressure level (also referred to as sound pressure level (SPL)), thereby maximally destructuring the aerodynamic wake. Nevertheless, it is preferable to ensure that the rotor is mechanically balanced over 360° with matching opposite blade profiles. For example, for a propeller having 12 blades it is possible to use six different blade configurations in order to generate six different wakes twice over.

The invention presents numerous advantages, in particular in terms of its implementation, which:
- is very simple, inexpensive, and requires no major, i.e. structural, modification to the blades;
- does not present a weight penalty, since modifying the surface state involves a thickness that can be considered as being negligible; and
- does not present any real penalty in terms of the aerodynamic performance of the rotor, which performance may on the contrary be somewhat improved (improved ability to withstand separation of the boundary layer as a result of the rough surface or improved efficiency as a result of the "shark's skin" surface).

The invention claimed is:

1. A turbine engine rotor comprising:
a plurality of rotor blades, wherein a wake of the rotor blades impacts against structural elements mounted downstream from the rotor blades,
wherein each of said rotor blades includes a determined zone between a trailing edge and at most 50% of the chord of the respective rotor blade, wherein the determined zone of each rotor blade includes a modified surface state acting on a flow approaching said trailing edge, and
wherein determined zones of two circumferentially consecutive rotor blades are of different lengths, such that a speed of the flow over said rotor blades is altered to modify the acoustic interaction of the flow against structural elements downstream from said rotor blades.

2. The rotor according to claim 1, wherein said determined zone is present over the entire height of the blade.

3. The rotor according to claim 1, wherein said modified surface state is present on the suction side of the blade.

4. The rotor according to claim 3, wherein said modified surface state comprises applying a textured paint or adhesively bonding a material acting as a rough skin, thereby slowing down the flow approaching said trailing edge.

5. The rotor according to claim 1, wherein said modified surface state is present on the pressure side of the blade.

6. The rotor according to claim 5, wherein said modified surface state comprises applying a textured paint or adhesively bonding a material providing a surface that is more effective from an aerodynamic point of view, so as to accelerate the flow approaching said trailing edge.

7. The rotor according to claim 6, wherein said modified surface state presents a "shark's skin" type surface state.

* * * * *